March 13, 1934.    R. B. MacMULLIN    1,951,160
MANUFACTURE OF MAGNESIUM CHLORIDE
Filed May 16, 1932
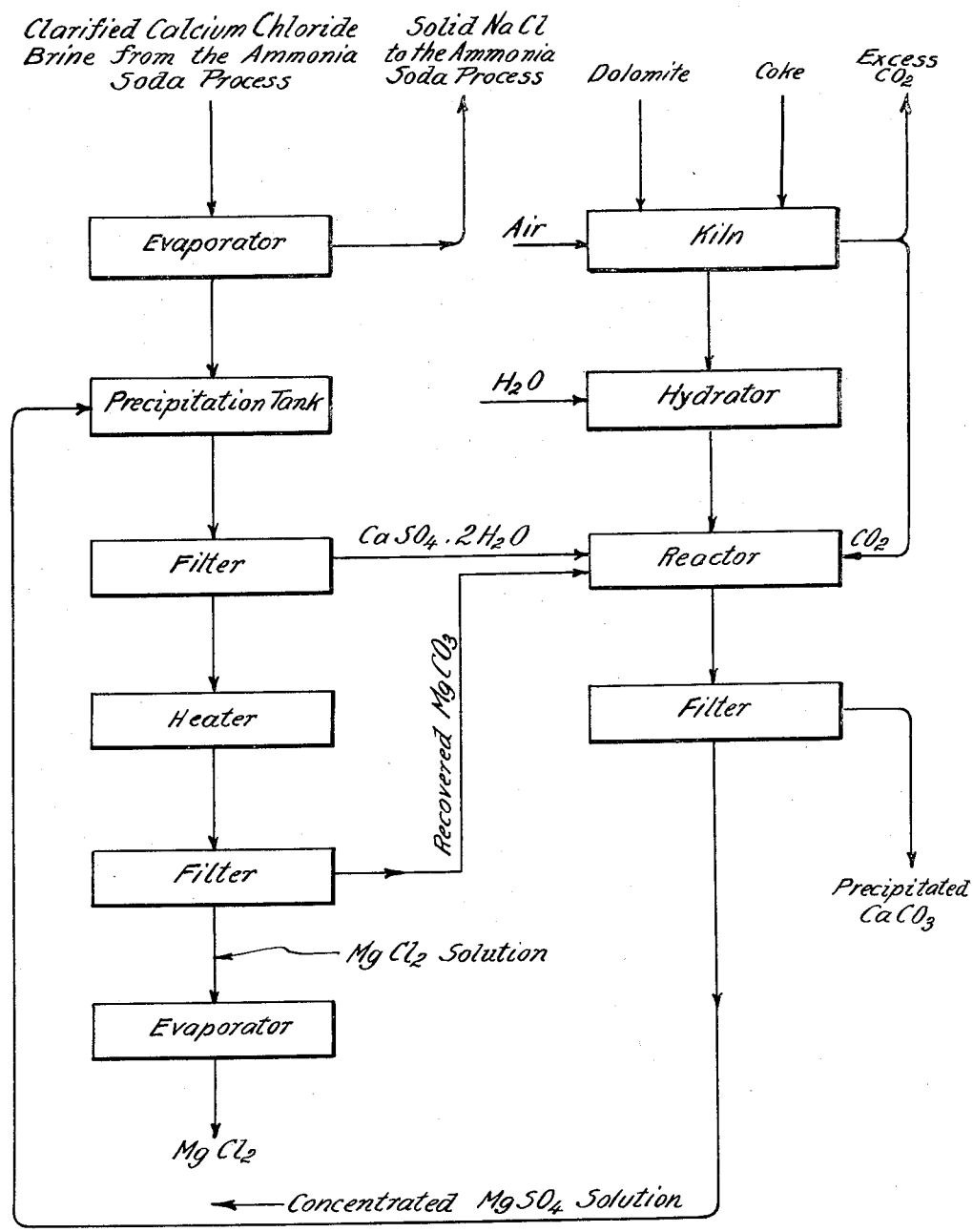
INVENTOR
Robert B. MacMullin
BY
Pennie, Davis, Marvin + Edmonds
ATTORNEYS

UNITED STATES PATENT OFFICE 1,951,160

MANUFACTURE OF MAGNESIUM CHLORIDE

Robert Burns MacMullin, Niagara Falls, N. Y., assignor to The Mathieson Alkali Works, Inc., New York, N. Y., a corporation of Virginia Application May 16, 1932, Serial No. 611,575

3 Claims. (Cl. 23—91)

This invention relates to improvements in the manufacture of magnesium chloride, $MgCl_2$, from calcium chloride, $CaCl_2$, and magnesium carbonate, $MgCO_3$. The invention is of special value and application in conjunction with the ammonia soda process, in the recovery of the calcium chloride brine produced in that process, but it is also of broader application.

Many attempts have been made to produce magnesium chloride by subjecting the ammonium chloride brine produced in the ammonia soda process to the action of magnesia or calcined dolomite. These attempts have failed to attain practical significance because of the large amount of steam required, because of the large excess of magnesium oxide required and because the magnesium chloride produced contained all the unconverted sodium chloride from the ammonia soda process. This invention provides an improved method for producing magnesium chloride, from the calcium chloride brine produced in the ammonia soda process, with magnesium carbonate which may be derived from magnesite or dolomite, for example. The invention is, however, generally applicable to the production of magnesium chloride from calcium chloride independently of the origin of the calcium chloride.

According to this invention, active magnesium carbonate is subjected to the action of hydrated calcium sulphate in the presence of water and carbon dioxide, and calcium chloride is subjected to the action of the resulting solution of magnesium sulphate after separation of calcium carbonate, or calcium and magnesium carbonates, from the magnesium sulphate solution. In the first step, magnesium carbonate is converted to magnesium sulphate and in the second step this magnesium sulphate is converted to magnesium chloride. In referring to "active magnesium carbonate" I refer to magnesium carbonate in a form such that it will react with carbon dioxide in the presence of water to form magnesium carbonate. In referring to "hydrated calcium sulphate" I refer to the several forms of calcium sulphate in various degrees of hydration but I exclude anhydrous calcium sulphate such as anhydrite. Various procedures for carrying out the first step of the combined operation of this invention are described in my copending application filed, May 16, 1932, Serial Number 611,574. The magnesium sulphate solution supplied from the first step to the second step of the combined operation of the invention may or may not be free from magnesium bicarbonate. For example, magnesium bicarbonate may be separated from this magnesium sulphate solution by heating to the boiling temperature followed by filtration before the magnesium sulphate solution is supplied to the second step. Or, for example, if the magnesium sulphate solution supplied to the second step contains magnesium bicarbonate, the magnesium chloride solution produced will contain magnesium bicarbonate which may be separated from this magnesium chloride solution by heating to the boiling temperature followed by filtration. By heating these solutions containing magnesium bicarbonate to the boiling temperature, carbon dioxide is expelled and the magnesium bicarbonate is precipitated as magnesium carbonate. The calcium chloride supplied to the second step of the combined operation of the invention may be supplied as a solid or as a brine. The immediate product of the second step of the combined operation of the invention is an aqueous solution of magnesium chloride. The magnesium chloride may be recovered from this solution, for example, by evaporation and crystallization or in any other appropriate manner.

The following example of the invention, as applied in conjunction with the ammonia soda process, and the accompanying drawing, which illustrates the operation of this example, as a flow sheet, will further illustrate the invention. Dolomite is calcined at a temperature of 750–1000° C. until the bulk of the carbon dioxide is expelled. The calcined dolomite is slaked with water. A gas mixture containing $CO_2$, flue gases for example, is passed through this slaked mixture until it is completely carbonated. Finely ground gypsum, $CaSO_4 \cdot 2H_2O$, is added to the carbonated mixture, and the carbonation is continued until absorption of carbon dioxide ceases. The precipitated calcium carbonate is filtered or centrifuged from the solution. A concentrated solution of magnesium sulphate containing some magnesium bicarbonate is thus obtained. Calcium chloride brine from the ammonia soda process is carbonated to precipitate any free lime present and the carbonated brine is clarified, by decantation or filtration for example. Sodium chloride is then separated from the clarified brine by evaporation and crystallization. This sodium chloride may be returned to the ammonia soda process. The calcium chloride brine may be supplied hot from the ammonia soda process to this evaporation. A concentrated aqueous solution of calcium chloride is thus obtained. These solutions of magnesium sulphate and calcium chloride so obtained are then brought together to precipitate calcium sulphate and to form a concentrated solution of magnesium chloride containing some magnesium bicarbonate. The precipitated calcium sulphate is filtered or centrifuged from the solution. This calcium sulphate may be returned to the magnesium carbonate-calcium sulphate reaction for the production of the magnesium sulphate solution. If magnesium sulphate as well as magnesium chloride are recovered as products of the combined operation, additional calcium sulphate must be supplied to this reaction. The magnesium chloride solution is heated to the boiling temperature to expel carbon dioxide and to precipitate magnesium carbonate and the precipitated magnesium carbonate is filtered from the solution. This magnesium carbonate may be returned to the magnesium carbonate-calcium sulphate reaction. A concentrated aqueous solution of magnesium chloride is thus obtained.

I claim:

1. In the production of magnesium chloride from calcium chloride and magnesium carbonate, the improvement which comprises subjecting active magnesium carbonate to the action of hydrated calcium sulphate in the presence of water and carbon dioxide and subjecting calcium chloride to the action of the resulting solution of magnesium sulphate after separation of calcium carbonate therefrom.

2. In the production of magnesium chloride from calcium chloride and magnesium carbonate, the improvement which comprises subjecting active magnesium carbonate to the action of hydrated calcium sulphate in the presence of water and carbon dioxide and subjecting calcium chloride to the action of the resulting solution of magnesium sulphate after separation of calcium and magnesium carbonates therefrom.

3. In the recovery of calcium chloride brine from the ammonia-soda process, the improvement which comprises subjecting active magnesium carbonate to the action of hydrated calcium sulphate in the presence of water and carbon dioxide and subjecting the calcium chloride brine to the action of the resulting solution of magnesium sulphate after separation of calcium carbonate therefrom.

ROBERT BURNS MacMULLIN.